Feb. 11, 1969 N. D. ROMANOS Re. 26,526

FLUID OPERATED STEAM GENERATOR HAVING STEAM OPERATED FEEDWATER PREHEATER

Original Filed Dec. 30, 1963

INVENTOR:
NICHOLAS D. ROMANOS

BY John F. Carney

ATTORNEY

United States Patent Office

Re. 26,526
Reissued Feb. 11, 1969

26,526

FLUID OPERATED STEAM GENERATOR HAVING STEAM OPERATED FEEDWATER PREHEATER

Nicholas Dimitrios Romanos, Chattanooga, Tenn., assignor to Combustion Engineering, Inc., Windsor, Conn., a corporation of Delaware Original No. 3,262,428, dated July 26, 1966, Ser. No. 334,526, Dec. 30, 1963. Application for reissue July 26, 1967, Ser. No. 661,147
U.S. Cl. 122—34 7 Claims
Int. Cl. B67d *5/26;* B65d *5/72, 25/40*

Matter enclosed in heavy brackets [ ] appears in the original patent but forms no part of this reissue specification; matter printed in italics indicates the additions made by reissue.

*ABSTRACT OF THE DISCLOSURE*

*A shell and tube type vapor generator adapted to provide for preheating of a vaporizable liquid, evaporation of that liquid together with vapor-liquid separation and superheating of the produced vapor all within a single vessel. The arrangement includes an axially elongated concentric baffle within which heating fluid conducting tubes are disposed and outside of which is located a downcomer passage which contains stored liquid for supplying the evaporation section of the unit. Preheating is accomplished by discharging feedwater into the downcomer passage in direct heat exchange relation with a portion of the vapor produced in the evaporation section. Vapor-liquid separation is effected by a reversing hood arrangement interposed between the evaporation section and the downcomer passage through which the vapor produced in the former must pass in flowing to a superheater section that occupies an elevated portion of the vessel.*

Figure 1:
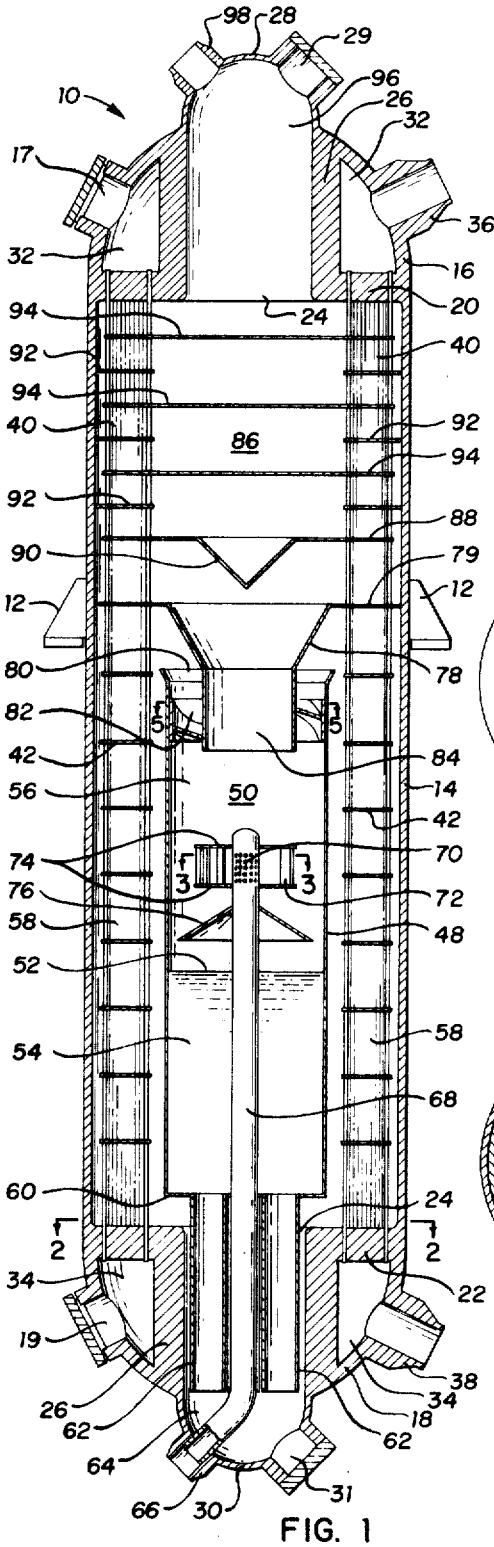

The present invention relates to a vapor generating apparatus. More particularly, it relates to a compact fluid heated shell and tube type vapor generator design in which preheating of a vaporizable liquid, evaporation, vapor separation and vapor superheating occur within a single vessel.

At the present time high temperature fluids are made available for heating purposes. These fluids may be in the form of a liquid or a high pressure gas from which heat can be extracted to transform a vaporizable liquid into vapor such that the so-created vapor can perform useful functions. One of the characteristic features of such heating fluids is that they are capable of transferring heat at a high rate and therefore it is a prime objective in designing vapor generators which employ these heating fluids to make efficient use of the heat. On the other hand, however, it is necessary to also consider factors other than unit efficiency in the design of such apparatus. For example, it is desirable in some instances, because of the limited space that is available for the system installation, to design the vapor generator such that it is compact in form. By the same token, it is always incumbent upon designers to keep the cost of construction low. In the past, one of the above factors could be given principle consideration only at the expense of the other two, however in the hereindisclosed vapor generator unit efficiency is enhanced without detracting from compactness or cost considerations.

The present invention provides an improved vapor generator design which is compact in form and operationally efficient yet structurally simple and economical to fabricate. It comprises a single pressure vessel which houses means to vaporize a liquid, means to effect separation of vapor from the vapor-liquid mixture resulting from heating of the liquid and means to impart a desirable degree of superheat to the separated vapor. Moreover, means are provided within the vapor generating unit to raise the temperature of the feedwater introduced to the unit such that it approaches the temperature of saturation when it eeners the evaporator portion. This is important for two reasons. First, it reduces thermal gradients within the vapor generator thereby lessening the danger of overstressing the component parts. This protective feature will exist even when the feedwater entering the unit during operation is at very low temperature. And secondly, it effects boiling heat transfer along supbstantially the full length of the evaporator heat transfer surface thereby resulting in more efficient use of the heat transfer surface.

The herein disclosed vapor generator is additionally characterized by operational versatility. While, in the preferred mode of operation, it is of the recirculating type, by merely adjusting the amount of feedwater admitted to the unit its operation can be changed to that of once-through flow without sacrificing plant efficiency.

For a better understanding of the invention, its operating advantages and the specific objects obtained by its use, reference should be made to the accompanying drawings and description which relate to a preferred embodiment of the invention.

Figure 2:
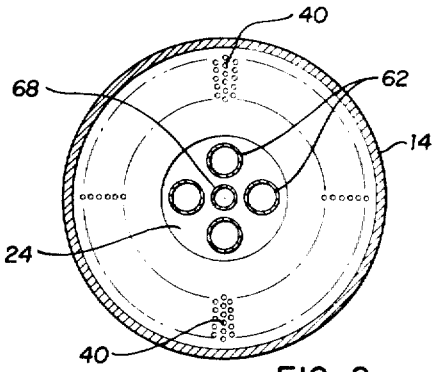
Figure 3:
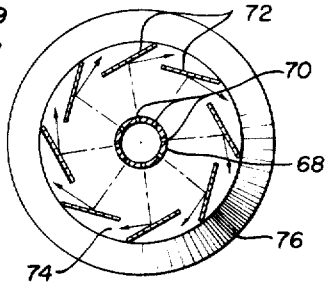
Figure 4:
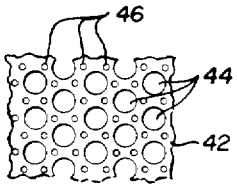
Figure 5:
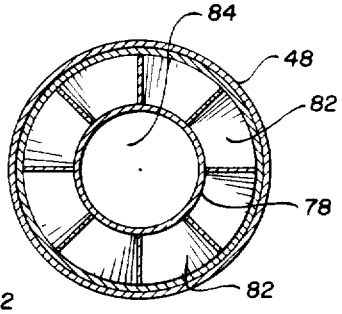

In the drawings:

FIG. 1 is a vertical section of the instant invention;
FIG. 2 is a section taken along line 2—2 of FIG. 1;
FIG. 3 is a section taken along line 3—3 of FIG. 1;
FIG. 4 is a section taken along line 4—4 of FIG. 1; and,
FIG. 5 is a section taken along line 5—5 of FIG. 1.

The vapor generator 10 comprises an elongated pressure vessel supported in a vertical position by means of supports 12 and formed of a cylindrical shell 14 which is closed at its upper and lower ends by hemispherical closure heads 16 and 18, respectively. Adjacent the upper and lower ends of the vessel are flat tube sheets 20 and 22 which extend normal to the shell axis and are attached at their periphery to the wall of the shell 14. Central apertures 24 are provided in the tube sheets 20 and 22 to permit passage of vaporizable fluid therethrough. Axially arranged cylindrical support nozzles 26 are fastened at one end to the tube sheets 20 and 22 in alignment with the openings 24 and at the other end to the wall of the closure heads 16 and 18 and serve to support the tube sheets intermediate their span thereby reducing the tube sheet thickness that would ordinarily be required to withstand the fluid pressures encountered in the unit. Dome caps 28 and 30 are attached to the wall of the closure heads 16 and 18 and close the ends of the support nozzles 26.

The tube sheets 20 and 22 form end chambers with the closure heads 16 and 18, the upper chamber being the heating fluid inlet chamber 32 and the lower chamber being the heating fluid outlet chamber 34. Nozzles, 36 and 38, are attached to the respective closure heads 16 and 18, and serve to connect the heating fluid chambers and a heat source (not shown) to and from which the heating fluid is continuously circulated. The tube sheets 20 and 22 are provided with a plurality of tube seats which accommodate the ends of a multiplicity of straight, small diameter tubes 40 which form a generally cylindrical tube bundle extending through the interior of the vessel and which serve to conduct heating fluid through the vessel from the inlet chamber 32 to the outlet chamber 34. Axially spaced annular tube support plates 42 serve to align the tubes 40 within the vessel and are, as shown in FIG. 4, provided with apertures 44 through which the tubes are permitted to pass as well as smaller apertures 46 which permit the passage of vaporizable fluid through the plates.

An enlarged conduit 48 is concentrically arranged within the vessel and extends axially through the tube bundle with the wall thereof positioned radially inwardly from the innermost of the tubes 40. This conduit 48 forms a reservoir 50 within the vessel and, when the vapor generator is in operation, contains a column of liquid having a level 52 which divides the reservoir 50 into a lower liquid space 54 and an upper vapor space 56. That portion of the vessel interior surrounding the conduit 48 is indicated as the evaporator portion 58 since it is in this area that the feedwater admitted to the unit extracts heat from the tubes 40 is transformed into vapor. As shown, the evaporator portion 58 contains at least a major portion of all of the tubes 40 which extend through the interior of the vessel.

The lower end of the conduit 48 is closed, as by means of the plate 60, and tubular extensions 62 connected to the plate extend into the dead-end space 64 formed at the bottom of the vessel by the lower support nozzle 26. The tubular extensions 62 extend substantially to the bottom of the dead-end space 64 and have open ends whereby liquid can flow from the liquid space 54 into the dead-end space 64 and thence to the evaporator portion 58. By means of the extensions 62 the dead-end space is prevented from becoming an area of fluid stagnation.

A feedwater inlet nozzle 66 connects to the lower dome cap 30 and effects communication of the generator with a source of feedwater (not shown). Communicating with the nozzle 66 is an elongated, centrally disposed feedwater pipe 68 which passes through the conduit closure plate 60 and extends upwardly into the storage space 50. As shown the pipe 68 extends through the liquid space 54 and has its upper end positioned above the liquid level 52 in the vapor space 56. The upper end of the feedwater pipe is closed but the feedwater outlet is formed by several rows of circumferentially spaced openings 70 which permit the feedwater, flowing from its source under pressure, to enter the reservoir 50 in the form of concentrated streams. Spaced outwardly from the openings 70 are a plurality of tangentially arranged, circumferentially spaced diffusor plates 72 mounted on the pipe 68 by means of brackets 74 which serve to diffuse the feedwater streams emanating from the openings 70 into particulate form in order to increase the surface area of the liquid. A cascade depressor 76 formed of an upwardly convergent conical plate is positioned below the feedwater outlet. The upper end of the cascade depressor 76 is attached to the feedwater pipe and its outer peripheral edge is spaced from the wall of the conduit 48 whereby the feedwater particles are collected and caused to flow into the liquid space 54 in a concentrated manner thereby reducing turbulence in the liquid level 52.

As shown in the drawing, the upper end of the conduit 48 is open to effect communication between the evaporator portion 58 of the vessel and the vapor space 56 with the reservoir 50. Separator means are provided within the opening to remove liquid from the liquid vapor mixture created in the evaporator portion. The separator means comprises a concentrically arranged reversing hood 78 having a cylindrical portion which is telescopically received within the upper end of the conduit 48 with the wall thereof spaced inwardly from the conduit wall thereby forming an annular separator inlet 80. An annular imperforate baffle 79 having its outer peripheral edge attached to the wall of shell 12 and its inner edge attached to the upper end of the reversing hood 78 directs the flowing fluid from the evaporator portion 58 into the separator inlet 80. In the space between the wall of the reversing hood 78 and the wall of the conduit 48 are provided a plurality of swirl-inducing vanes 82 which are curved plates capable of imparting a swirling motion to the mixture entering the separator whereby the heavier, liquid particles are flung outwardly by centrifugal force against the wall of the conduit 48 upon which the removed liquid flows downwardly into the liquid space 54. The lighter steam is caused to reverse its direction and flow upwardly through the steam passage 84 reversing hood into the superheater portion of the vessel indicated as 86.

Within the superheater portion 86 means are provided whereby the vapor created in the evaporator portion 58 extracts heat from the tubes 40 of the tube bundle thus imparting a desirable degree of superheat thereto. This means includes a baffle arrangement for directing the vapor back and forth across the tubes 40. As shown in FIG. 1, the baffle arrangement includes directly above the upper end of the reversing hood 78 a baffle plate 88 which extends across the interior of the vessel with its outer peripheral edge spaced from the wall 12 of the vessel to permit steam flow between the edge of the plate and the vessel wall. The plate 88 is formed with a conical deflector 90 which serves to direct the vapor radially outwardly in a manner whereby turbulence is reduced. Also included in the baffle arrangement are axially spaced baffles, some of which, 92, have a central opening, and their outer edge attached to the wall of the vessel so as to permit flow only through the central opening and others, 94, which extend across the interior of the vessel with the outer peripheral ends spaced from the vessel wall whereby the vapor flowing through the superheater portion 86 is caused to flow along a tortuous path back and forth across the tubes 40 from which heat is received to raise its temperature. The vapor leaves the superheater portion 86 through the passage 96 formed by the upper support nozzle 24 and the vapor outlet nozzle 98 attached to the upper dome cap 28 from whence it can be conducted to a point of use.

Manways 17, 19, 29 and 31, provide access to the interior of the vapor generator for service and maintenance of the various components.

The operation of the vapor generator 10 is as follows. A high temperature, high pressure heating fluid flow from its source through the inlet nozzle 36 into the chamber 32 and thence is conducted by means of the tubes 40 downwardly first through the superheater portion 86 of the vessel and then through the evaporator portion 58 thereof into the outlet chamber 34 and thence out of the generator by means of the heating fluid outlet nozzle 38. At the sam time, feedwater enters the generator under pressure through the feedwater inlet nozzle 66 and flows upwardly through the feedwater pipe 68 and out the openings 70 into the liquid space 54 of reservoir 50 and thence into the evaporator portion 58 of the generator where it receives heat from the heating fluid flowing through the tubes 40 and is transformed into a vapor-liquid mixture. By means of the hydrostatic head differential between the liquid column in reservoir 50 and the liquid-vapor mixture in evaporator 58 circulation is maintained through the unit with the vapor-liquid mixture flowing from the top of the evaporator portion 58 into the separator inlet 80 where vanes 82 impart a swirling motion to the mixture thereby causing the removal of the heavier liquid particles therefrom by centrifugal force. The removed liquid flows along the wall of conduit 48 into the liquid space 54. The vapor separated from the mixture reverses its direction and flows upwardly through the passage 84 in reversing hood 78 into the superheating portion 86 of the vessel wherein it is directed back and forth by means of the baffling arrangement across the heating-fluid bearing tubes 40 whereby heat is extracted from the heating fluid thereby raising the temperature of the vapor above saturation by an amount which is determined by the saturation temperature of the vapor and the temperature of the heating fluid flowing through the tubes. The superheated steam is removed from the vessel through vapor outlet nozzle 98 and conducted to a point of use such as a turbine installation or the like. During operation of the generator the liquid level 52 in reservoir 50 is set to give a recirculation ratio which is sufficiently low to prevent carryover of liquid into the superheating portion 86 yet is sufficiently high to permit washing of the tube surface located in the top of the evaporator portion 58 in order to reduce the danger of experiencing formation of chemical deposits thereon which would tend to reduce the over-all efficiency of the unit. If it is determined, by a drop in superheat temperature or otherwise, that the separator is flooded and liquid carryover to the superheating portion is occurring the liquid level 52 can be lowered by reducing the amount of feedwater admitted to the unit thereby lowering the recirculation ratio and concomitantly the amount of liquid in the vapor-liquid mixture admitted to the separator.

As shown, the outlet end of the feedwater pipe 68 is located in the vapor space 56 of the reservoir 50. The feedwater leaving the openings 70 in the form of concentrated streams strikes the diffusor plates 72 and is in diffused form when it enters the vapor space 56 where it comes in contact with steam condensing a portion thereof which causes the temperature of the feedwater to be raised. The water then falls to the cascade depressor 76 where it combines with the hot recirculating water being discharged from separator 80 thus raising the temperature further. Here the conical shape of the cascade depressor 76 causes the combined water to strike the wall of conduit 48 and flow down to the liquid space 54 where the flow continues downward to extension 62 causing heat transfer through the wall of conduit 48 thereby causing an additional temperature rise. In the preferred embodiment the temperature of the feedwater leaving the reservoir 50 and entering the evaporator portion 58 is just below saturation temperature. Having the feedwater close to saturation temperature is desirable for several reasons. First, it reduces the thermal gradient across the thickness of the tube sheet 22 and lower support nozzle 24 adjacent the discharge end of the tubular extension 62 thereby decreasing the danger of the establishment of undue thermal stresses within these members. Secondly, evaporation of the feedwater will begin almost immediately within the evaporator portion 50 thereby effecting boiling heat transfer between the heating fluid and the feedwater along the heat transfer surface of the tubes. With the establishment of boiling heat transfer the adverse effect of water film along the surface of the tubes is reduced thereby providing a more favorable heat transfer co-efficient for a given temperature head resulting in more effective use of the heat transfer surface available in the generator.

While, in the preferred mode of operation, the hereindescribed vapor generator is of the recirculating type wherein the recirculated liquid is separated from the liquid-vapor mixture by means of a centrifugal type separator allowing essentially dry vapor to enter the superheater portion of the vapor generator, the mode of operation can be converted to a once-through type wherein the vapor leaving the evaporator portion is essentially dry, by merely reducing the amount of incoming vaporizable liquid for a sufficient time to establish a new liquid level in the reservoir 50 forming the core of the vapor generator, such that the difference between the hydrostatic heads of the so established liquid column and the resulting less dense liquid-vapor mixture surrounding the evaporator tubes is just adequate to establish flow through the evaporator and the centrifugal separator when the vapor generator is operating at full load. In addition, with the use of the variable hydrostatic head characteristic in the liquid reservoir previously described, the pressure of the superheated vapor can be maintained constant when the vapor generator is operated at reduced loads simply by lowering the liquid level below that which is required for full load once-through operation such that the top portion of the evaporator heating surface is used as a vapor heat exchanger which transfers heat at a rate much lower than an equivalent heating surface used as a liquid-vapor mixture heat exchanger. The reduced load operation previously described wherein the variable hydrostatic head characteristic can convert the top portion of the evaporator heating surface into a less efficient vapor or superheating surface will automatically allow the heating fluid temperature leaving the vapor generator to rise when no other means is employed to reduce the temperature or the flow rate of the heating fluid entering the vapor generator. Conversely, by raising the level of the liquid reservoir, the liquid-vapor mixture level will be raised causing this surface to operate as a more efficient liquid-vapor mixture heat exchanger thus increasing the amount of heat removed from the heating fluid and automatically reduce the temperature of the heating fluid leaving the vapor generator.

This inherent characteristic may be used if desired as a means of control for certain heat sources used to supply heat to the heating fluid. One such application may be found in a typical pressurized water nuclear reactor system, such as that disclosed in copending application, Serial No. 42,574 by Powell et al., wherein the major portion of the power level control is dependent upon the divergence from the average temperature between the water entering and leaving the nuclear core. In such a reactor system, when the temperature of the water entering the reactor core is raised, the temperature of the water leaving the core is automatically reduced a corresponding amount such that the average temperature between the water entering and leaving the core is constant. This condition results in reducing the power output. When the temperature of water entering the core is reduced, the reverse occurs and the temperature of the water leaving the core and the power level is raised. The change in the temperature of the water entering the core is dictated by the amount of heat removed from the reactor water, which is the vapor generator heating fluid, as it flows through the tubes comprising the heat transfer surface of the vapor generator.

There has thus been described a novel vapor generator design characterized by compactness of form and efficiency of operation. By means of the disclosed construction there is provided a vapor generator comprising a single vessel within which can occur feedwater preheating and steaming, along with vapor separation and superheating in a highly efficient manner. Because of the simplicity of the instant design units several times larger in capability than present day units man be built economically without imposing restrictions on performance or manufacturing equipment.

It will be understood that various changes in the details, steps and arrangement of parts, which have been herein described and illustrated in order to explain the nature of the invention, can be made by those skilled in the art without departing from the principle and scope of the invention as expressed in the appended claims.

What is claimed is:

1. A vapor generator comprising a vertically elongated pressure vessel having an evaporator portion and a superheating portion; an elongated conduit concentrically arranged in the evaporator portion of said vessel having its wall spaced from the wall of said vessel to form a downcomer reservoir within said conduit and the evaporator portion thereabout; said downcomer reservoir having an upper vapor space and a liquid space at its lower end communicating with said evaporator portion; heating fluid tubes extending through said evaporator portion and said superheating portion; an annular opening in said conduit wall at the upper end thereof effecting communication between said evaporator portion and said vapor space; vapor separator means including circumferentially spaced, downwardly curved swirl-including vanes positioned in said opening and attached to said conduit and a centrally disposed reversing hood having its lower end communicating with said vapor space below the discharge end of said vanes; annular partition means being attached to and extending between said vessel wall and said reversing hood above said annular opening separating said evaporator portion from said superheating portion; baffle means for directing fluid into repeated engagement with the heating fluid tubes in said superheating portion and vapor outlet means communicating with said superheating portion.

2. A vapor generator comprising a vertically elongated pressure vessel; an elongated conduit concentrically arranged within said vessel having its wall spaced from the wall of said vessel to form a downcomer reservoir within said conduit and an evaporator portion thereabout; heating fluid tubes extending through said evaporator portion; said downcomer reservoir having a liquid space at its lower end communicating with said evaporator portion and a vapor space above said liquid space; an annular opening in said conduit wall at the upper end thereof effecting communication between said evaporator portion and said vapor space; vapor separator means including circumferentially spaced, downwardly curved swirl-inducing vanes positioned in said opening and attached to said conduit and a centrally disposed reversing hood having its lower end communicating with said vapor space below the discharge end of said vanes; said water supply means positioned within said downcomer reservoir including a feedwater inlet nozzle communicating with the bottom of said vessel, an elongated tube connected to said nozzle and extending vertically through said liquid space with its upper, discharge end being closed and positioned in said vapor space, a plurality of circumferentially spaced openings in said tube being capable of each discharging said feedwater into said vapor space in a concentrated stream, a plurality of diffusor plates radially spaced from said openings at a distance to be impinged upon by said streams whereby diffusion thereof is effected within said vapor space; an annular partition attached at its outer peripheral edge to the wall of said vessel and at its inner peripheral edge to the upper end of said reversing hood above said annular opening separating said evaporator portion from said superheating portion; baffle means for directing fluid into repeated engagement with the heating fluid tubes in said superheating portion and vapor outlet means communicating with said superheating portion.

3. A vapor generator comprising a vertically elongated, cylindrical pressure vessel having an evaporator portion and a superheating portion; an elongated conduit concentrically arranged within said vessel having its wall spaced from the wall of said vessel to form a downcomer reservoir having a vapor space and a liquid space within said conduit and an evaporator portion thereabout; an annular opening in said conduit wall at the upper end thereof effecting communications between said evaporator portion and said vapor space; vapor separator means including circumferentially spaced, downward curved swirl-inducing vanes positioned in said opening and attached to said conduit and a centrally disposed reversing hood having its lower end communicating with said vapor space below the discharge end of said vanes; tube sheet means adjacent the lower end of said vessel attached to the wall thereof forming a heating fluid chamber below said evaporator portion; heating fluid tubes extending through said evaporator portion and said superheating portion having their ends attached to said tube sheet in fluid communication with said heating fluid chamber; enlarged aperture means in said tube sheet in axial alignment with said conduit; a cylindrical nozzle aligned with said tube sheet aperture means, attached at its upper end to said tube sheet and at its lower end to said pressure vessel wall forming a dead-end space; a feedwater supply means positioned within said downcomer reservoir including a feedwater inlet nozzle communicating with the bottom of said dead-end space, an elongated tube connected to said nozzle and extending vertically through said liquid space with its upper, discharge end being closed and positioned in said vapor space, a plurality of circumferentially spaced openings in said tube being capable of each discharging feedwater into said vapor space in a concentrated stream, a plurality of diffusor plates radially spaced from said openings at a distance to be impinged upon by said streams whereby diffusion thereof is effected within said vapor space; cascade depressor means comprising an upwardly convergent conical shroud attached to and surrounding said elongated tube intermediate said discharge end and said liquid space, said shroud having its peripheral edge positioned closely adjacent said conduit wall; annular partition means attached at its outer peripheral edge to the wall of said vessel and its inner edge to said conduit above said annular opening separating the evaporator portion from the superheating portion; baffle means for directing fluid into repeated engagement with the heating fluid tubes in said superheating portion and vapor outlet means communicating with said superheating portion.

4. A vapor generator comprising a vertically elongated pressure vessel having a vapor outlet in the top thereof; an elongated conduit concentrically arranged within said vessel having its wall spaced from the wall of said vessel to form a downcomer reservoir therewithin and an evaporator portion thereabout; heating fluid tubes extending through said evaporator portion; said downcomer reservoir being adapted to contain a body of liquid having a liquid level defining a lower liquid space and a vapor space thereabove; inlet means for discharging feedwater into said liquid space; opening means at the bottom of sad conduit establishing communication between said liquid space and said evaporator portion; a reversing hood concentrically positioned within the upper end of said conduit with the wall of said reversing hood extending to a point substantially spaced from said liquid level and being spaced from the wall of said conduit to define an annular opening for establishing communication between said evaporator portion and said vapor space; and a plurality of circumferentially spaced, downwardly curved, swirl-inducing vanes positioned in said annular opening between the walls of said conduit and said reversing hood effective for separating liquid from the vapor-liquid mixture generated in said evaporator portion by centrifugal action.

*5. A vapor generator comprising a vertically elongated pressure vessel defining an enclosed chamber; a plurality of tubes extending through said chamber; means for circulating heating fluid through said tubes; an axially elongated conduit disposed within said chamber in concentric relation to the wall of said vessel and cooperating therewith to define a first fluid passage enclosing at least a portion of said tubes and a second fluid passage concentric with said first fluid passage and devoid of tubes; means for supplying feedwater to said chamber to provide a body of liquid therein having a level transecting said first and second fluid passages to define a lower liquid space and an upper vapor space in each of said passages, said feedwater supply means communicating with the vapor space in said second fluid passage; a vapor outlet from the vapor space of said first fluid passage; means for passing liquid from said second fluid passage to said first fluid passage for flowing said liquid in heat exchange relation with the heating fluid flowing through said tubes to evaporate at least a portion of said liquid; and means for passing at least a portion of the vapor produced in said first fluid passage into the vapor space of said second fluid passage in heat exchange relation with the feedwater being supplied thereto for preheating said feedwater.*

*6. A vapor generator according to claim 5 wherein said said conduit cooperates with the wall of said vessel to define an annularly arranged first fluid passage about said conduit and an axially disposed second fluid passage therewithin; and including first laterally disposed plate means having a central opening spaced above the top of said conduit; second, generally cylindrical axially elongated plate means depending from the opening in said first plate means with the lower end of said second plate means extending into said conduit concentrically spaced from the wall thereof to form a reversing hood operative to pass vapor from said first fluid passage to the vapor space in said second fluid passage.*

*7. A vapor generator according to claim 6 including a plurality of circumferentially spaced, downwardly curved, swirl-inducing vanes disposed in the space between said conduit and said second plate means for imparting*

*a spin to the evaporated liquid admitted to said second fluid passage.*

References Cited

The following references, cited by the Examiner, are of record in the patented file of this patent or the original patent.

UNITED STATES PATENTS

| | | | |
|---|---|---|---|
| 198,737 | 1/1878 | Fulton | 122—438 |
| 232,342 | 9/1880 | Fulton | 122—438 |
| 2,121,999 | 6/1938 | Trepaud | 122—34 |
| 2,862,479 | 12/1958 | Blaser et al. | 122—34 |
| 2,845,906 | 8/1958 | Gram | 122—34 |
| 3,129,697 | 4/1964 | Trepaud | 122—34 |

KENNETH W. SPRAGUE, *Primary Examiner.*

U.S. Cl. X.R.

122—491